US011223798B1

(12) United States Patent
Ling et al.

(10) Patent No.: US 11,223,798 B1
(45) Date of Patent: Jan. 11, 2022

(54) METHODS AND SYSTEM FOR TRANSMITTING CONTENT DURING A NETWORKED CONFERENCE

(71) Applicant: Zoom Video Communications, Inc., San Jose, CA (US)

(72) Inventors: Bo Ling, Saratoga, CA (US); Hailei Sheng, San Jose, CA (US); Lin Han, Los Altos, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 16/945,125

(22) Filed: Jul. 31, 2020

(51) Int. Cl.
*H04N 7/14* (2006.01)
*H04L 29/06* (2006.01)
*H04L 1/08* (2006.01)

(52) U.S. Cl.
CPC .............. *H04N 7/147* (2013.01); *H04L 1/08* (2013.01); *H04L 63/0428* (2013.01); *H04L 65/1069* (2013.01); *H04L 65/403* (2013.01)

(58) Field of Classification Search
CPC .............. H04N 7/14; H04L 29/06; H04L 1/08
USPC ........................................... 348/14.01–14.16
See application file for complete search history.

(56) References Cited

U.S. PATENT DOCUMENTS

| 2008/0077953 | A1* | 3/2008 | Fernandez | H04N 7/15 725/32 |
| 2012/0056971 | A1* | 3/2012 | Kumar | H04L 65/403 348/14.02 |
| 2014/0184721 | A1* | 7/2014 | Zhang | G06F 3/048 348/14.02 |
| 2014/0327731 | A1* | 11/2014 | Wang | H04L 65/403 348/14.09 |
| 2017/0228135 | A1* | 8/2017 | Vendrow | H04L 65/403 |
| 2019/0082142 | A1* | 3/2019 | Pell | H04L 65/1089 |
| 2020/0228973 | A1* | 7/2020 | Kasabwala | H04L 9/0833 |

* cited by examiner

*Primary Examiner* — Melur Ramakrishnaiah
(74) *Attorney, Agent, or Firm* — Kilpatrick Townsend & Stockton LLP

(57) ABSTRACT

Methods and systems for transmitting content during a networked conference. In an embodiment, a method is provided that includes establishing a network connection between a first user equipment (UE) and a second UE, generating a video signal at the first UE, selecting content at the first UE, transmitting the video signal from the first UE over a first network channel, and transmitting the content from the first UE over a second network channel. The method also includes receiving the video signal on the first channel at the second UE, receiving the content on the second channel at the second UE, combining the video signal and the content into a combined video signal at the second UE, and displaying the combined video signal on a display device at the second UE.

20 Claims, 8 Drawing Sheets

METHOD FOR TRANSMITTING AND RECEIVING VIDEO AND CONTENT DURING A NETWORKED CONFERENCE

METHOD FOR OPERATING A
TRANSMITTER APPARATUS

METHOD FOR OPERATING A
SERVER APPARATUS

METHOD FOR OPERATING A
RECEIVER APPARATUS

METHODS AND SYSTEM FOR TRANSMITTING CONTENT DURING A NETWORKED CONFERENCE

FIELD

The exemplary embodiments of the present invention relate to the field of network communication. More specifically, the exemplary embodiments of the present invention relate to transmitting content during a networked conference.

BACKGROUND

With the increasing popularity of digital electronics and network communications, real-time interactive networked conferences have become more popular. For example, network conferencing applications now allow people to communicate with each other from remote locations to exchange audio and video in real time.

During a networked conference, meeting attendees can transmit a video signal to other attendees. A typical conferencing system is configured with a camera that captures an image of a conference attendee and transmits this image to other attendees. To increase the effectiveness of a network conference, it is desirable to allow content, such as a document, to be transmitted from one attendee, such as from a meeting host to other attendees. One way to share content is to embed an image of the content in the video image of the host user. Unfortunately, embedding the content image in the host image may result in a less sharp or distorted image when viewed on the displays of other attendees. Thus, it is desirable to have a mechanism to transmit content between attendees of a networked conference that results in improved image quality and efficiency over conventional systems.

SUMMARY

In various embodiments, system and methods are provided for transmitting content during a networked conference. A video signal of a user and a content signal are generated at a first networked device. The video signal and content signals are transmitted over separate network channels, through a network server, to one or more destination devices. At a destination device, the video and content signals are combined into a combined signal for display at the destination device. User input at the destination device is used to determine the size, location, aspect ratio, and other display parameters of the video and content signals. In an embodiment, the content signal forms a background image at the second device. In another embodiment, the video signal and the content signal are configured in a picture-in-picture arrangement for display at the second device. Combining the video and content signals at the second device provides higher quality than embedding the content signal into the video signal before network transmission. The system is also suitable for end-to-end encryption of the video and content signals since these signals are not accessed by any intermediate network servers during transmission.

In an embodiment, a method is provided that includes establishing a network connection between a first user equipment (UE) and a second UE, generating a video signal at the first UE, selecting content at the first UE, transmitting the video signal from the first UE over a first network channel, and transmitting the content from the first UE over a second network channel. The method also includes receiving the video signal on the first channel at the second UE, receiving the content on the second channel at the second UE, combining the video signal and the content into a combined video signal at the second UE, and displaying the combined video signal on a display device at the second UE.

In an embodiment, apparatus is provided for content transmission in a networked conference. The apparatus comprises a network server that establishes a network connection between a first UE and a second UE, a camera that generates an image signal that is converted to a video signal at the first UE, content at the first UE, a first transmitter that transmits the video signal from the first UE over a first network channel, and a second transmitter that transmits the content from the first UE over a second network channel. The apparatus also comprises a first receiver that receives the video signal on the first channel at the second UE, a second receiver that receives the content on the second channel at the second UE, a combiner that combines the video signal and the content into a combined video signal at the second UE, and a display that displays the combined video signal at the second UE.

In an embodiment, a non-transitory computer readable medium is provided on which are stored program instructions that, when executed by one or more processors, cause the one or more processors to perform operations of: establishing a network connection between a first UE and a second UE; generating a video signal at the first UE; selecting content at the first UE; transmitting the video signal from the first UE over a first network channel; transmitting the content from the first UE over a second network channel; receiving the video signal on the first channel at the second UE; receiving the content on the second channel at the second UE; combining the video signal and the content into a combined video signal at the second UE; and displaying the combined video signal on a display device at the second UE.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
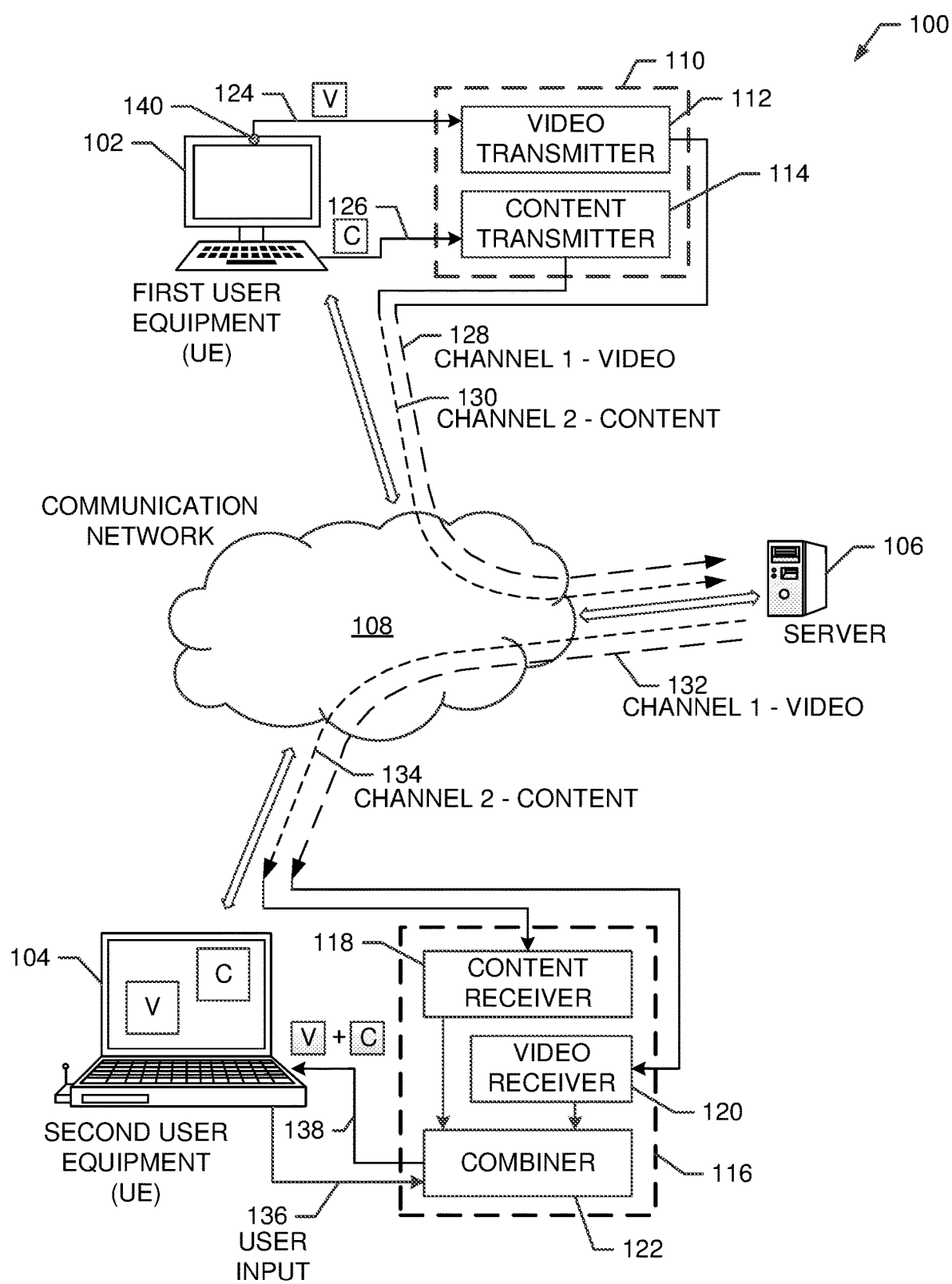
FIG. 1 shows a diagram illustrating a communication network that implements an interactive real-time audio/video conference in which a video signal and a content signal from a first user equipment are transmitted for display on a second user equipment.

Embodiments of the present invention disclose systems, methods, and apparatus for providing transmission of a video signal and content (i.e., a content file) from a first user equipment for display on a second user equipment. The content can be selectably displayed as background or with the video signal in a picture-in-picture configuration or in individual picture windows.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine or computer for execution. The instructions may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a diagram illustrating a communication network 100 that implements an interactive real-time audio/video conference in which a video signal and content signal from a first user equipment are transmitted for display on a second user equipment. In accordance with various embodiments, the transmitted content can be displayed at the second user equipment as a background image for the video signal. In another embodiment, the video and content signals can be displayed in a picture-in-picture configuration, or as two adjustable and resizable images on the display of the second user equipment.

The communication network 100 comprises first user equipment 102 and second user equipment 104. The first and second user equipment are configured to communicate in a networked conference utilizing a network server 106 and communication network 108. In an embodiment, the communication network 108 comprises a wired communication network, a wireless communication network, or a combination of wired and wireless communication networks.

The user equipment 102 comprises transmitter apparatus 110. The user equipment 104 comprises receiver apparatus 116. During a networked conference, a user at the first user equipment desires to transmit video and content to be displayed to a user at the second user equipment 104. A camera 140 at the first user equipment 104 captures a video image 124 that includes the user and the current background at the location of the first user equipment. The user of the first user equipment 102 identifies content at the first user equipment to be used, for example, as a background image at the second user equipment. For example, the content 126 comprises a PowerPoint file, Excel file, PDF file, or any other type of content file or computer file, including media files, document files, and image files. The content also comprises live content or screen shots captured from the user equipment, other camera inputs, including a virtual camera, IP camera, and images from a capture card. In another embodiment, the content comprises screen content projected or "cast" from mobile devices, including IOS and android devices. In an embodiment, the video image and content could be from different users, respectively, for example, images from two user's cameras are used as the video image and the content, respectively.

During operation the video image 124 captured by the camera 140 is input to a video transmitter 112, and the content file 126 is input to a content transmitter 114. The video transmitter 112 extracts a user image from the video image 124 and encodes this user image as a video signal that is transmitted in a first channel (1) 128 over the network 108 to the network server 106. The content transmitter 114 encodes and transmits the content in a second channel (2) 130 over the network 108 to the server 106. For example, the content 126 can be a screen shot of an Excel file, image, or PDF file.

The server 106 receives the video and content over the first channel 128 and the second channel 130. The server 106 operates to determine other users in the networked conference that are to receive the video and content. For example, the server 106 has a list of the conference attendees in a local memory. The server 106 re-transmits the video to the determine users over a first video channel 132 and the server 106 also transmits the content to the determine users over a second channel 134. The server 106 does not decode, decrypt, inspect, open, or otherwise access the video and content. It should be noted that the transmission channels 128 and 130 are between the first user equipment 102 and the server 106, and the transmission channels 132 and 134 are between the server 106 and the second user equipment 104. In an embodiment, the channels 128, 130, 132, 134 are separate and distinct network channels. In another embodiment, the channels can be combined utilizing any suitable network protocol. In another embodiment, the channels 128 and 132 are two portions of the same channel, and the channels 130 and 134 are two portions of the same channel.

The second user equipment 104 is a member of the networked conference and is able to receive the re-transmitted content and video signals from the server 106. The receiver apparatus 116 comprises a content receiver 118, a video receiver 120, and a combiner 122. The content receiver 118 receives the content on the second network channel 134 and outputs the received content to the combiner 122. The video receiver 120 receives the re-transmitted video signal from the server 106 on the first network channel 132. The video receiver 120 processes the received video and outputs the processed video to the combiner 122.

The combiner 122 receives user input 126 and uses this input to determine how to combine the video signal and the content. In an embodiment, the content represents a background image to be displayed on the second user equipment. The orientation, size, screen location, and various aspect ratios of the video signal and the content are determined from the user input 136. The combiner 122 forms a combined signal 138 comprising the video signal and the content that is displayed on the second user equipment 104. It should be noted that the content receiver is configured to receive and process all the possible content types mentioned above. The content is processed to generate a content image that is passed to the combiner 122. The combiner 122 combines the received video and the content image to generate a combined image 138 that is displayed on the user equipment 104. The user input 136 is used to adjust the size, position, and various aspects of the video and content images on the display.

In various exemplary embodiments, the user at the first user equipment is able to identify content that can be transmitted and utilized as a background image on a display at the second user equipment. During operation, video of the first user and the content are transmitted over separate network channels. The server receives these channels and re-transmits them to various users in the network conference. The server does not process or otherwise inspect the video or content signals. This enables end-to-end encryption from the first user equipment to the second user equipment.

In various exemplary embodiments, the system for content transmission between users of a networked conference provide at least the following advantages over conventional systems.

1. Provides a mechanism for a content at one user device to be transmitted and used as a background image or as a picture-in-picture image at a second user device.

2. Enables end-to-end encryption since intermediate servers do not access the content but merely re-transmit the content to its final destination.

3. Content combining is performed at the destination device, which provides better quality since the content is not transmitted as an embedded image in the video signal.

4. Image processing is pushed to the destination device, which utilizes the processing power of the destination device and saves costs by not relying on intermediate servers to perform this function.

More detailed descriptions of the various implementations and operations of the system comprising apparatus 110, server 106, and apparatus 116 are provided below.

Figure 2:
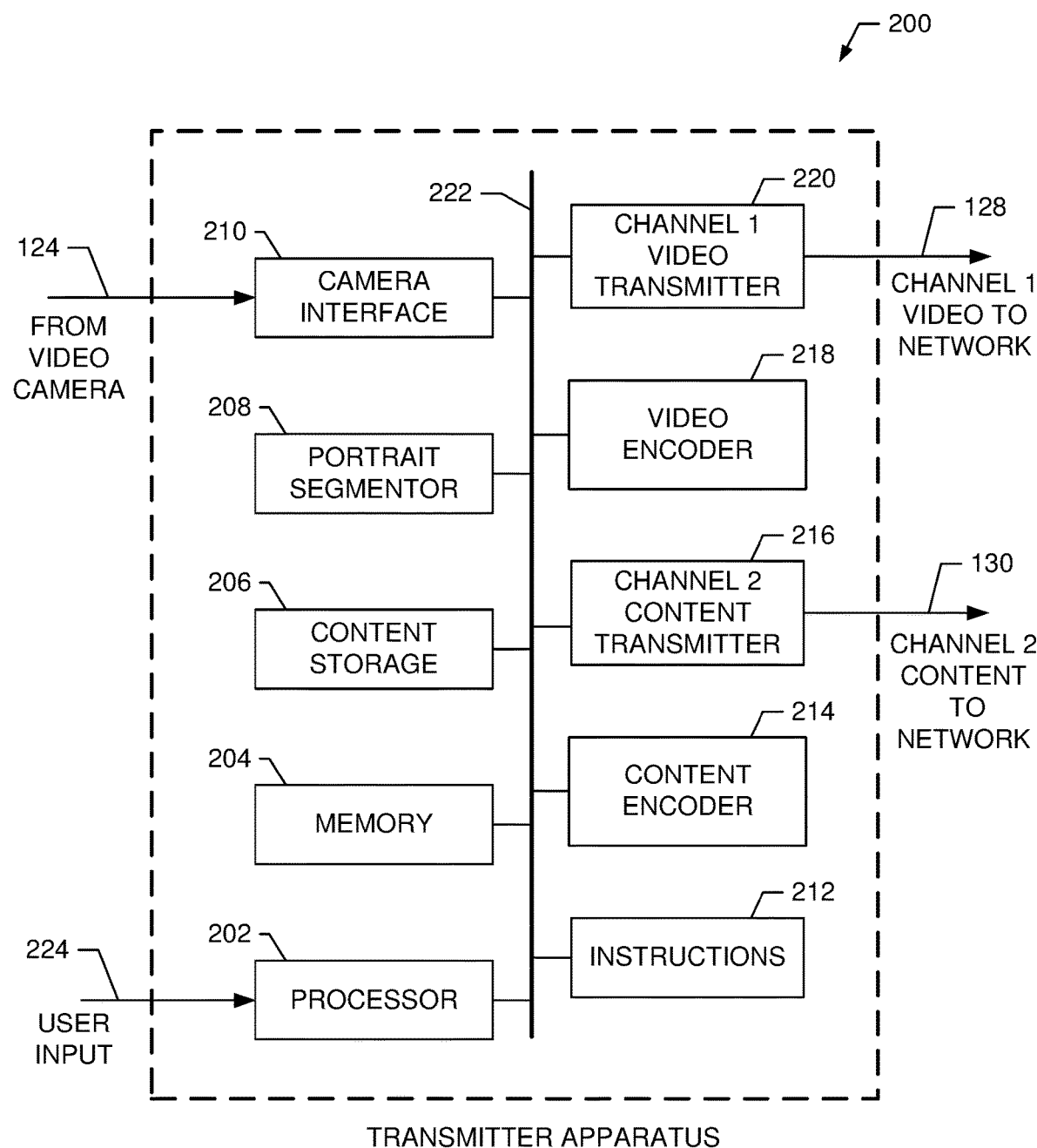
FIG. 2 shows an exemplary detailed embodiment of a transmitter apparatus constructed in accordance with various exemplary embodiments.

FIG. 2 shows an exemplary detailed embodiment of a transmitter apparatus 200. For example, the transmitter apparatus 200 is suitable for use as the transmitter apparatus 110 shown in FIG. 1. The transmitter apparatus 200 comprises processor 202, memory 204, content storage 206, portrait segmentor 208, and camera interface 210. The transmitter apparatus 200 also comprises instruction memory 212 stored in an instruction memory, content encoder 214, channel 2 content transmitter 216, video encoder 218, and channel 1 video transmitter 220. All of the components of the transmitter apparatus 200 couple to communicate over internal bus 222.

During operation, the processor 202 retrieves and executes instructions 212 to control the functions and operations of the components of the transmitter apparatus 200. In an embodiment, the camera interface 210 receives a camera image 124 from the camera 140 at the first user equipment 102. The camera image received by the camera interface 210 is input to the portrait segmentor 208, which processes the image to extract a user image. For example, the portrait segmentor 208 performs any suitable segmentation algorithm or function to extract the user image from the camera image.

The processor 202 receives user input 224, and based on the user input, retrieves content from the content storage 206. The content comprises a computer file, such as a PowerPoint file, Excel spreadsheets, PDF file, or other content type as described herein.

The content obtained from the content storage 206 is input to the content encoder 214. The content encoder 214 operates to encode and/or encrypt the content for transmission over a network connection. At the same time, the user image output from the portrait segmentor 208 is input to the video encoder 218. The video encoder 218 operates to encode and/or encrypt the user image to generate a video signal for transmission over a network connection. The output of the video encoder 218 is input into the channel 1 video transmitter 220, which transmits the video signal over the network 108 on a first channel 128 to the server 106.

The encoded content from the content encoder 214 is input to the channel 2 content transmitter 216, which transmits the content over the network 108 on a second channel 130 to the server 106.

In an exemplary embodiment, the transmitter apparatus 200 performs at least the following operations to transmit content during a networked conference.

1. Capture a camera image from a camera and extract a user image (portrait) from the camera image.

2. Encode, compress, and/or encrypt the user image to form a video signal and transmit over a first channel of a network connection to a server of the networked conference.

3. Receive user input, and based on user input select content for transmission. The content comprises any of the content types described herein.

4. Encode, compress, and/or encrypt the content and transmit over a second channel of a network connection to a server of the networked conference.

Figure 3:
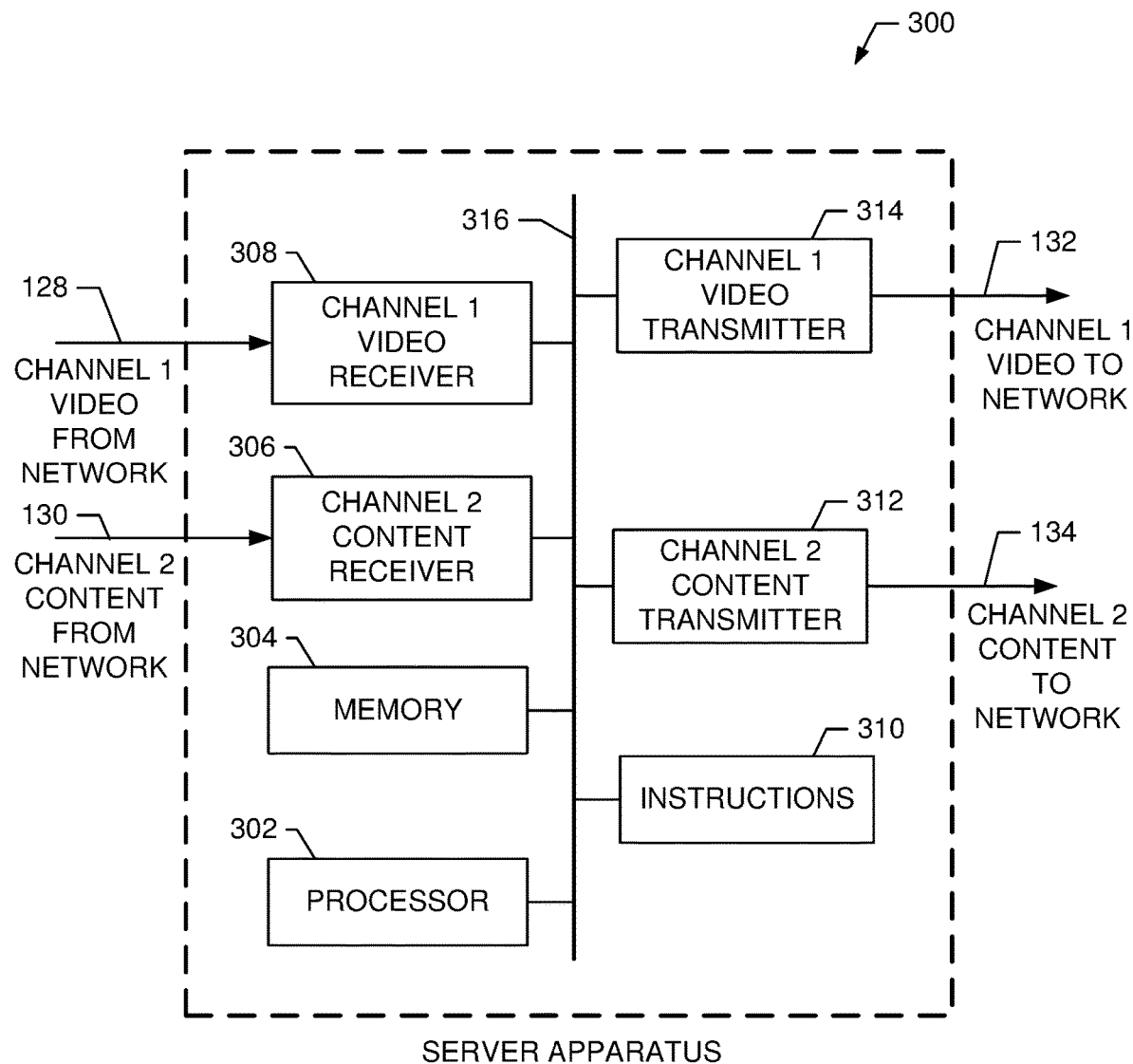
FIG. 3 shows an exemplary detailed embodiment of a server apparatus constructed in accordance with various exemplary embodiments.

FIG. 3 shows an exemplary detailed embodiment of a server apparatus 300. For example, the server apparatus 300 is suitable for use as the server 106 shown in FIG. 1. In an embodiment, the server 300 comprises processor 302, memory 304, channel 2 content receiver 306, and channel 1 video receiver 308. The server 300 also comprises instructions 310 stored in an instruction memory, channel 2 content transmitter 312, and channel 1 video transmitter 314. During operation, the processor 302 executes instructions 310 and utilizes the memory 304 as necessary to perform the functions of the server 300 as described herein.

A video signal is received from the network 108 on channel 1 128 as input to the channel 1 video receiver 308. A content signal is received from the network 108 on channel 2 130 as input to the channel 2 content receiver 306. In an embodiment, the server apparatus 300 does not decode or process the video signal or the content signals received from the network 108 on channel 1 128 or channel 2 130. Instead the apparatus 300 simply re-transmits the video and content signal to other attendees of the networked conference. The memory 304 comprises a list of conference attendees and the processor 302 retrieves this information. The processor 302 determines the users to receive the video and content signal and re-transmits the video and content signals to those users. For example, the channel one video transmitter 314 operates to transmit the video signal on channel 1 132 to other conference attendees in the network. The channel 2 content transmitter 312 operates to transmit the content signal on channel 2 134 to other conference attendees in the network Therefore, in various exemplary embodiments, the server apparatus 300 receives the video and content signals from the first user equipment and re-transmits the video and content signals to other users participating in the networked conference. In this configuration, the server apparatus does not decode or decrypt the content or the video signals but merely re-transmits them to other users on the network. This operation enables end-to-end the video and the content encryption since the server apparatus 300 does not access the video or content in any way.

Figure 4:
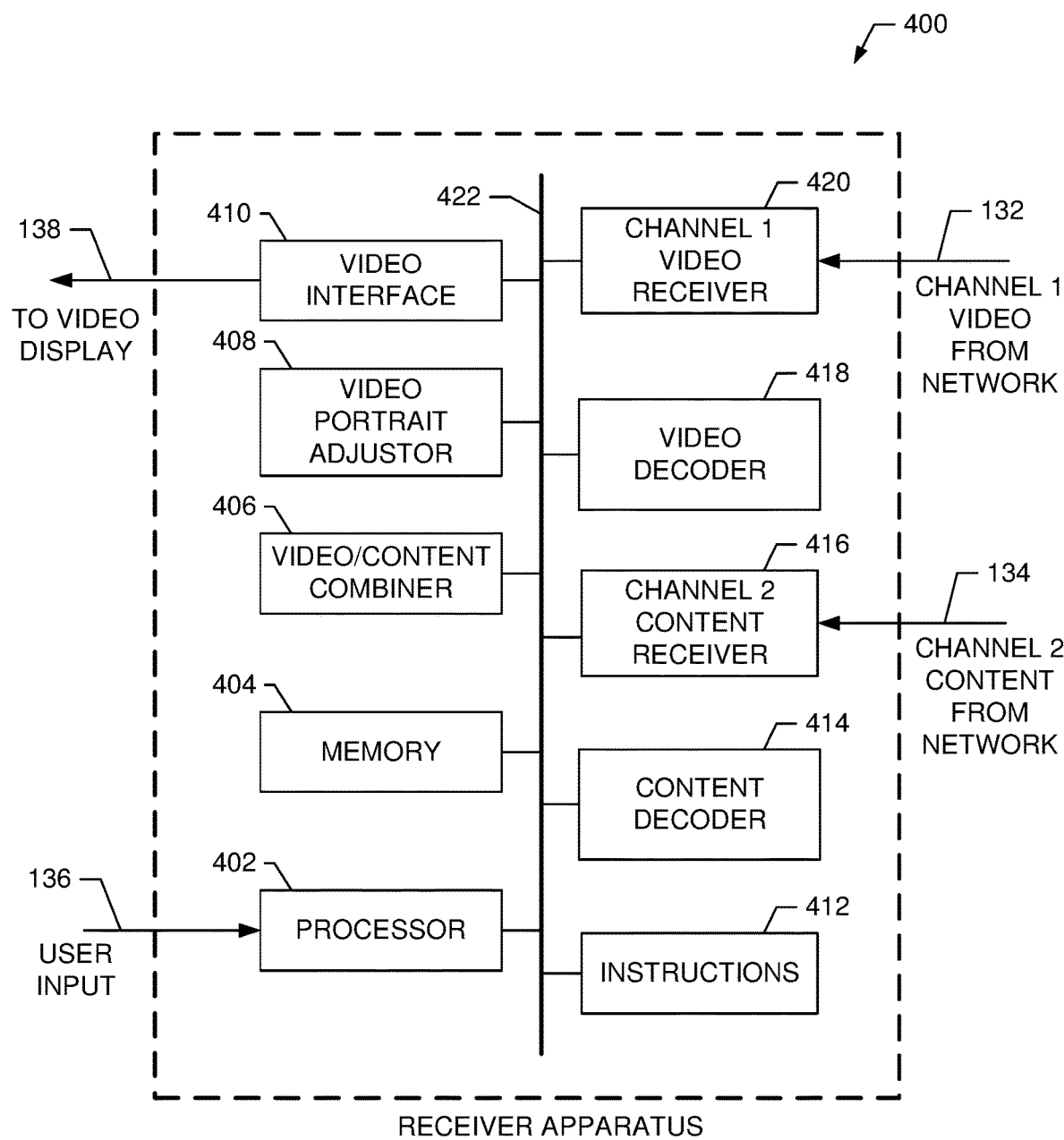
FIG. 4 shows an exemplary detailed embodiment of a receiver apparatus constructed in accordance with various exemplary embodiments.

FIG. 4 shows an exemplary detailed embodiment of a receiver apparatus 400. The receiver apparatus 400 is suitable for use as the receiver apparatus 116 shown in FIG. 1. In an embodiment, the receiver apparatus 400 comprises processor 402, memory 404, video content combiner 406, video portrait adjustor 408, and video interface 410. The receiver apparatus 400 also comprises instructions 412 stored in an instruction memory, content decoder 414, channel 2 contact receiver 416, video decoder 418, and channel 1 video receiver 420.

During operation the processor 402 executes instructions 412 and utilizes the memory 400 as necessary to perform the functions of the receiver apparatus describe herein. A video signal on channel 1 132 of a network connection is received by the channel 1 video receiver 420. A content signal on channel 2 134 of a network connection is received by the channel 2 content receiver 416. For example, the video and content signals are received from the server 106.

The channel 1 video receiver 420 passes the received video to the video decoder 418. The video decoder 418 decodes and/or decrypts the video signal and outputs a decoded video signal to the video portrait adjuster 408. The video portrait adjuster 408 adjust the decoded video image to produce an adjusted video image that is passed to the video/content combiner 406. The channel 2 content receiver 416 receives the content signal and passes the content signal to the content decoder 414. The content decoder 414 decodes and/or decrypts the content and passes the decoded content to the video/content combiner 406. For example, the content decoder 414 is configured to process a computer file, such as a PowerPoint file, Excel spreadsheets, PDF file, image, or other content type as described herein to produce a content image that is passed to the combiner 406.

The processor 402 receives user input 136 from the user of UE 104. The user input 136 specifies the size, location, rotation, and/or aspect ratios of the video and content images to be presented on a display of the UE 104. For example, the content image may be displayed as a background image or as part of a picture-in-picture configuration with the video image. Based on user input, the processor 402 controls the video/content combiner 406 to adjust the locations, sizes, and/or shapes of the video and content images to generate a combined video signal. The content combiner 406 then passes the combined video signal to the video interface 410. The video interface 410 outputs the combined video signal over the communication path 138 to the UE 104 for presentation on a display device of the UE 104.

During operation, the processor 402 may receive additional user input 136, which is used to control the video/content combiner 406 to dynamically adjust the display of the content and video images on the display device of the UE 104.

Figure 5:
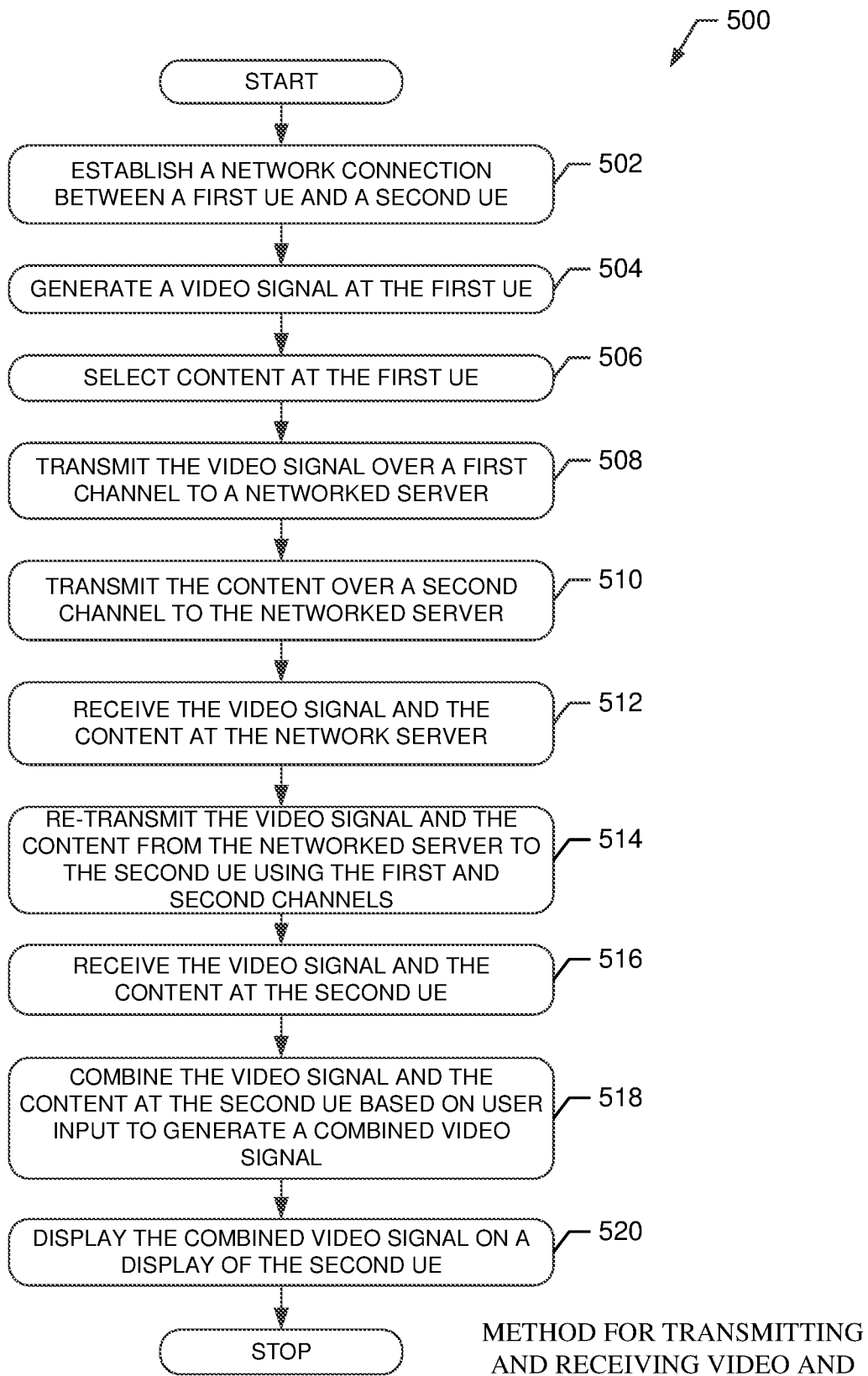
FIG. 5 shows an exemplary method for transmitting and receiving video and content between users of a networked conference.

FIG. 5 shows an exemplary method 500 for transmitting and receiving video and content between users of a networked conference. For example, in an embodiment, the method 500 is performed by the transmitter apparatus 110, server 106, and receiver apparatus 116 shown in FIG. 1.

At block 502, a network connection is established between a first user and a second user. For example, as illustrated in FIG. 1, the first user 102 and the second user 104 participate in a networked conference facilitated by the server 106 utilizing the communication network 108.

At block 504, a video signal is generated at the first user equipment. For example, the first user equipment 102 comprises a camera 140 that generates a camera image 124. The camera image 124 comprises the image of the first user and the first users' background. The camera image is input to the portrait segmentor 208 that extract the user's image, which is processed by the video encoder 218 to generate a video signal.

At block 506 content to be transmitted is selected at the first user equipment. For example, a user of the first user equipment selects content 126 to be transmitted. For example, the content is stored in the content storage 206. In an embodiment, the content can be a PowerPoint file, Excel file, PDF file, image, or other content type described herein.

At block 508, the video signal is transmitted over a first channel 128 to a network server 106 utilizing a communication network 108. For example, the channel 1 video transmitter 220 transmits the video signal over the network channel 1 128.

At block 510, the selected content 126 is process and transmitted by the content transmitter 216 over network channel 2 132 to the server 106.

At block 512, the video signal on network channel 1 and the content signal on network channel 2 are received at the server 106. For example, the server 106 comprises the channel 1 receiver 308 that receives the video signal and the channel 2 receiver 306 that receives the content.

At block 514, the video signal and the content received at the server 106 are re-transmitted over the network 108. For example, the video content is re-transmitted over network channel 1 132 and the content is re-transmitted over network channel 2 134 by the video transmitter 314 and the content transmitter 312, respectively.

At block 516, the video signal and the content are received at the second UE. For example, the video signal is received over Channel 1 132 and the content is received over channel 2 134. The video is received by the video receiver 420 and the content is received by the content receiver 414.

At block 518, the video signal and the content signal are processed and combined at the second user equipment based on user input to generate a combined video signal. For example, the video signal is processed by the video decoder 418 and then passed to portrait adjustor 408. The output of the portrait adjustor 408 is passed to the video/content combiner 406. The content receiver 416 passes the received content to the content decoder 414, which decodes the content and passes the decoded content image to the video/content combiner 406. The processor 402 receives user input 136 that indicates how the video and content images are to be combined. The processor 402 controls the combiner 406 to combine the video and content images based on the received user input. The combined signal is passed to the video interface 410 that outputs the combined image signal on communication path 138 to the display of the user equipment 104.

At block 520 the user equipment 104 displays the combined video image having the video image and the content on the screen. During operation the user may provide additional user input 136 to control the combiner 122 to change size, location, and/or the ratio of the video and the content images on the screen.

Thus, the method 500 operates to transmit video and content between users of a networked conference. It should be noted that the operations of the method 500 are exemplary and not limiting of the scope of the embodiments. Furthermore, the operations of the method 500 can be changed, deleted, rearranged, added to, or otherwise modified within the scope of the embodiments.

Figure 6:
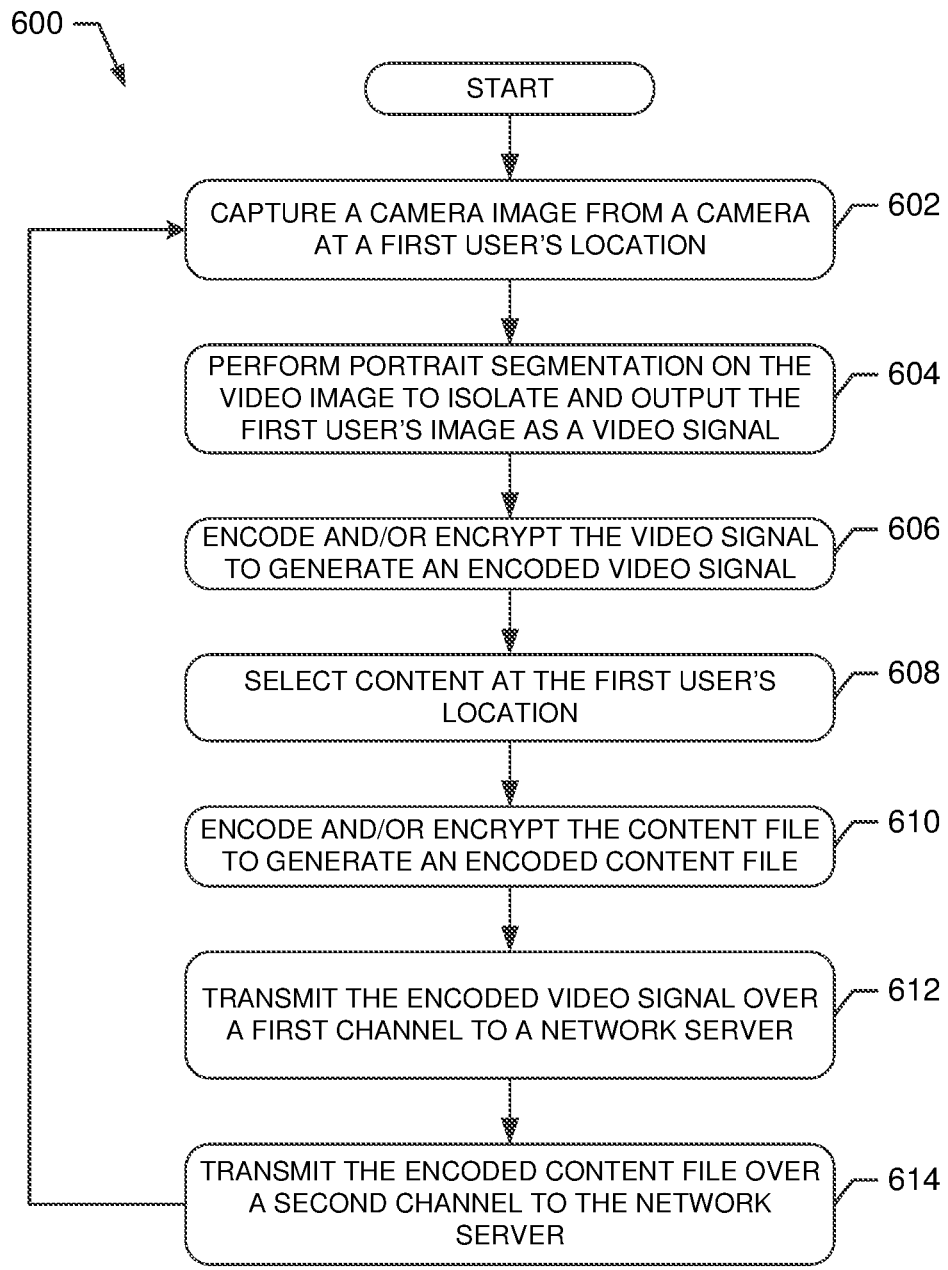
FIG. 6 shows an exemplary method for transmitting video and content from a first user equipment to one or more attendees of a networked conference.

FIG. 6 shows an exemplary method 600 for transmitting video and content from a first user equipment to one or more attendees of a networked conference. For example, the method 600 is performed by the transmitter apparatus 200 shown in FIG. 2.

At block 602, a camera image is captured by a camera at the first user's location. For example, the first user equipment 102 comprises the camera 140 that captures an image of the user and background as a camera image 124.

At block 604, portrait segmentation is performed on the camera image to isolate and output the first user's image as a video signal. For example, the portrait segmentor 208 receives the camera 124 image from the camera interface 210 and segments the image to extract a portrait of the user as the video signal.

At block 606, the video signal is encoded and/or encrypted to generate an encoded video signal for transmission. For example, the video encoder 218 encodes the video signal from the portrait segmentor 208 to generate an encoded video signal for transmission. In an embodiment, the video signal in encrypted for end-to-end encryption.

At block 608, content at the first use of location is selected. For example, the processor 202 receives user input 224, which identifies content to be selected for transmission.

For example, in an exemplary embodiment, the selected content will form a background image at a second user device. The content comprises a computer file, such as a PowerPoint file, Excel spreadsheets, PDF file, image or other content type as described herein.

At block 610, the selected content file is encoded and/or encrypted for transmission. For example, the selected content is input to the content encoder 214 for encoding and/or encryption to generate an encoded content signal before transmission. In an embodiment, the content signal in encrypted for end-to-end encryption.

At block 612, the encoded video signal is transmitted over a first channel to a network server. For example, the encoded video signal output from encoder 218 is input to the channel 1 video transmitter 220 for transmission over Channel 1 128 to the network server.

At block 614, the encoded content is transmitted over a second channel to the network server. For example, the content encoder 214 outputs the encoded content to the channel 2 content transmitter 216. The channel 2 contact transmitter 216 transmits the content over a channel 2 130 network connection to the network server.

Thus, the method 600 operates to transmit video and content from a first UE to a network server. It should be noted that the operations of the method 600 are exemplary and not limiting of the scope of the embodiments. Furthermore, the operations of the method 600 can be changed, deleted, rearranged, added to, or otherwise modified within the scope of the embodiments.

Figure 7:
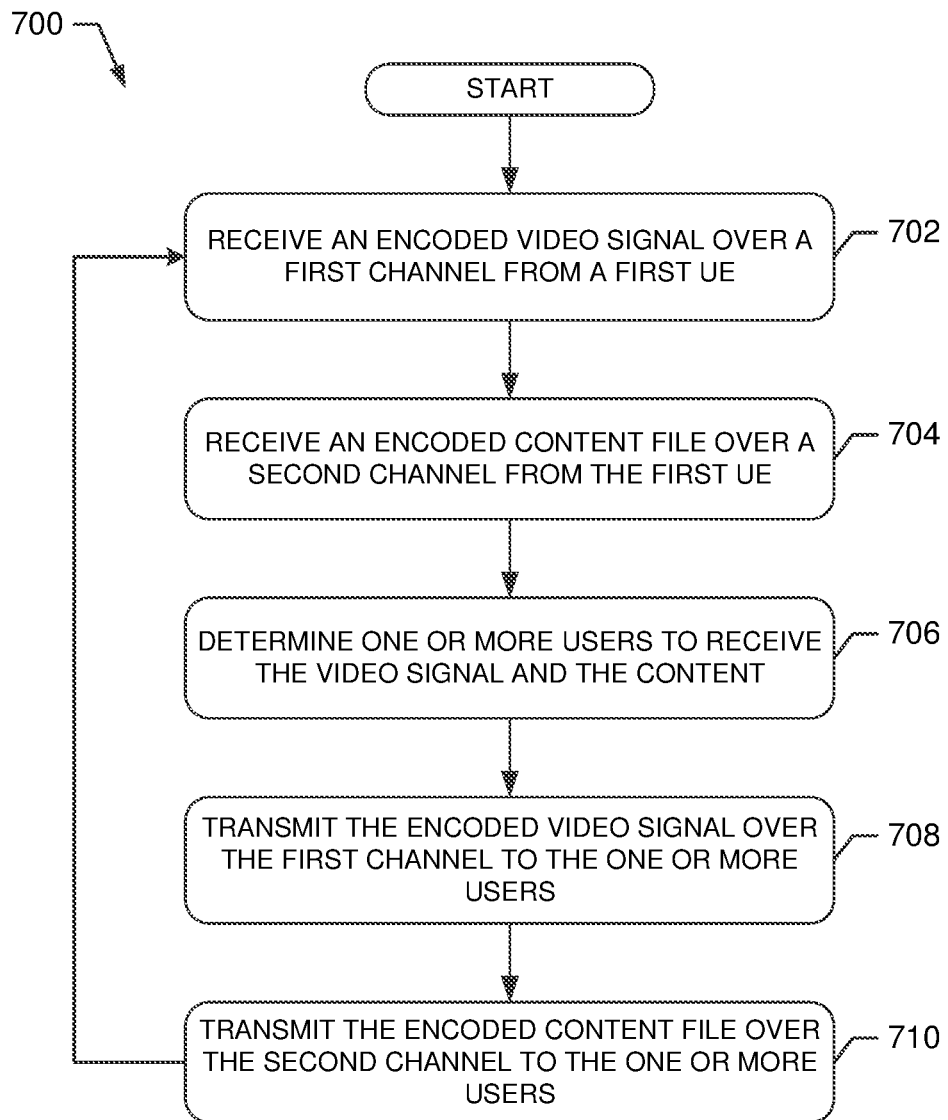
FIG. 7 shows an exemplary method for receiving video and content from a first user equipment and re-transmitting the video and content to one or more attendees of a networked conference.

FIG. 7 shows an exemplary method 700 for receiving video and content from a first user equipment and re-transmitting the video and content to one or more attendees of a networked conference. For example, the method 700 is performed by the server 300 shown in FIG. 3.

At block 702, an encoded video signal is received over a first channel from a first user. For example, the server 300 receives the encoded video over channel 1 128 from the first user equipment 102. The video is received by the channel 1 video receiver 308.

At block 704, encoded content is received over a second network channel from the first user. For example, the server 300 receives the encoded content over a channel 2 130 from the user equipment 102. For example, the content is received by the content receiver 306.

At block 706 one or more users are determined to receive the video signal and the content. For example, the memory 304 comprises a list of attendees that participate in a video conference. The processor 302 executes instructions 310 to retrieve the list and determine which of the attendees are to receive the video signal and the content signal.

At block 708, the encoded video signal is transmitted over a network channel from the server 300 to the one or more attendees. For example, the processor 302 controls the channel 1 video transmitter 314 to transmit the video signal over the network channel 132 to the one or more attendees of the conference. For example, the user 104 shown in FIG. 1 receives the video signal on the network channel 132.

At block 710, the receive content is transmitted over a second network channel from the server 300 to the one or more attendees of the conference. For example, the processor 302 executes instructions 310 to control the content transmitter 312 to transmit the content over a second network channel 134 to the one or more attendees.

Thus, the method 700 performed by the server 300 operates to receive and re-transmit video and content between users of a networked conference. It should be noted that the operations of the method 700 are exemplary and not limiting of the scope of the embodiments. Furthermore, the operations of the method 700 can be changed, deleted, rearranged, added to, or otherwise modified within the scope of the embodiments.

Figure 8:
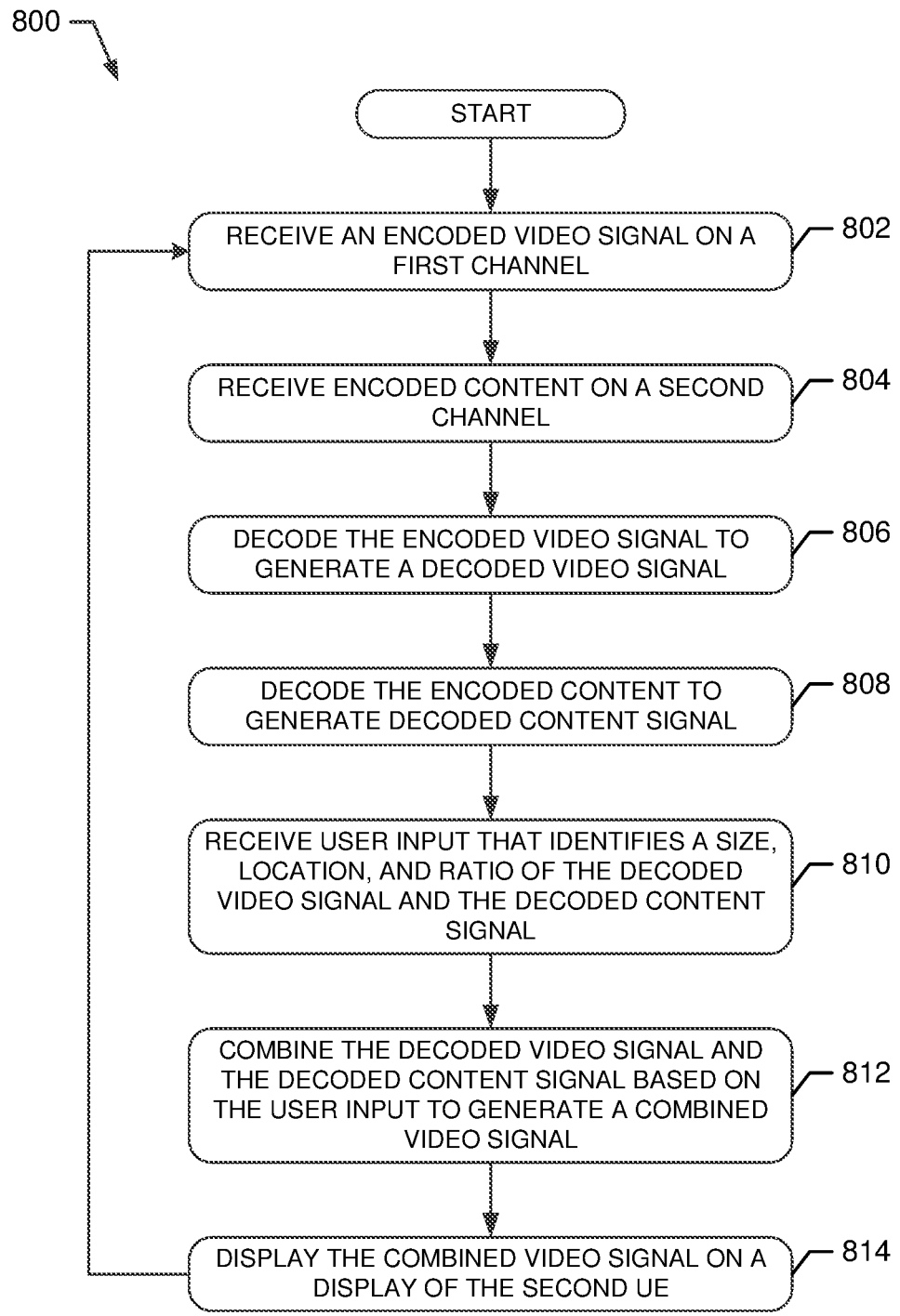
FIG. 8 shows an exemplary method for receiving video and content from a server during a networked conference.

FIG. 8 shows an exemplary method 800 for receiving video and content from a server during a networked conference. For example, the method 800 is performed by the receiver apparatus 400 shown in FIG. 4.

At block 802, an encoded video signal is received over first network channel at a receiver of second user equipment. For example, the channel 1 video receiver 420 receives an encoded video signal over network channel 1 132 from the network server 106.

At block 804, an encoded content signal is received on a second network channel a receiver of second user equipment. For example, the channel 2 content receiver 416 receives encoded content over a second network channel 134 from the network server 106.

At block 806, the encoded video signal is decoded to generate a decoded video signal. For example, the video decoder 418 decodes the received video signal to generate a decoded video signal that is input to the video portrait adjustor 408. The adjustor 408 adjusts the size of the video signal and outputs the adjusted video signal to the video/content combiner 406.

At block 808, the encoded content is decoded to generate a decoded content image. For example, the content decoder 414 decodes the received encoded content to generate a decoded content image.

At block 810 user input is received that identifies size, location, and ratio of the decoded video image and the decoded content image to be displayed on a user display device. For example, the processor 402 receives user input 136 that indicates the size, location, and ratio of the video and content images to be displayed. In an embodiment, the processor 402 executes instructions 412 and utilize the memory 404 to perform the functions of the receiver apparatus described herein.

At block 812, the video image and the content image are combined based on the user input to generate a combine video signal. For example, the video/content combiner 406 receives the video image from the adjustor 408 and the content image from the content decoder 414 and generates a combined video signal in accordance with the user input 136.

At block 814, the combined video signal is displayed on a display of the second user equipment. For example, the output of the video/content combiner 406 is input to the video interface 410, which transmits the video signal 138 to be displayed on the user display. In an embodiment, additional user input 136 is received which further adjusts the size, location, aspect ratios, and other characteristics of the video and content signals. These adjustments will be reflected on the video display.

Thus, the method 800 performed by the receiver apparatus 400 operates to receive video and content from a network server and display the received video and content on a user display device. It should be noted that the operations of the method 800 are exemplary and not limiting of the scope of the embodiments. Furthermore, the operations of the method 800 can be changed, deleted, rearranged, added to, or otherwise modified within the scope of the embodiments.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 404 or instructions memory 412. Volatile media includes dynamic memory. Common forms of storage media include, for example, a floppy disk, a flexible disk, a hard disk, a solid-state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 422. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, for instance, bus 422, which carries the data to memory 412, from which processor 402 retrieves and executes the instructions. The instructions may optionally be stored on a storage device either before or after execution by processor 402.

The exemplary embodiment of the present invention includes various processing steps described herein. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from these exemplary embodiments of the present invention and its broader aspects. Therefore, the appended claims are intended to encompass within their scope all such changes and modifications as are within the true spirit and scope of these exemplary embodiments of the present invention.

What is claimed is:

1. A method for content transmission in a networked conference, the method comprising:
    establishing a network connection between a first UE and a second UE;
    generating a video signal at the first UE;
    selecting a content file at the first UE;
    transmitting the video signal from the first UE over a first network channel;
    transmitting the content file from the first UE over a second network channel;
    receiving the video signal on the first channel at the second UE;
    receiving the content file on the second channel at the second UE;
    decoding the content file to generate a content image;
    combining the video signal and the content image into a combined video signal at the second UE, wherein the content image forms a background image for the video signal; and
    displaying the combined video signal on a display device at the second UE.

2. The method of claim 1, wherein the operation of generating the video signal comprises:
    receiving an image signal from a camera; and
    performing portrait segmentation on the image signal to extract an image of a user to form the video signal.

3. The method of claim 1, further comprising:
    encoding the video signal before transmission from the first UE on the first channel; and
    encoding the content file before transmission from the first UE on the second channel.

4. The method of claim 1, further comprising:
    receiving the video signal on the first network channel and the content file on the second network channel at a server; and
    re-transmitting the video signal on the first network channel and the content file on the second network channel from the server to the second UE.

5. The method of claim 4, further comprising:
    re-transmitting the video signal and the content file from the server without decoding the video signal or the content.

6. The method of claim 1, further comprising decoding the video signal at the second UE and decoding the content file at the second UE.

7. The method of claim 1, further comprising:
    receiving user input at the second UE that identifies at least one of size, location, and ratio of the video signal and the content image; and
    combining the video signal and the content image into a combined video signal based on the user input.

8. The method of claim 7, wherein the video signal and the content image from a picture-in-picture configuration.

9. The method of claim 1, further comprising performing end-to-end encryption of the video signal and the content file between the first UE and the second UE.

10. Apparatus for content transmission in a networked conference, the apparatus comprising:
    a network server that establishes a network connection between a first UE and a second UE;
    a camera that generates an image signal that is converted to a video signal at the first UE;
    a content file at the first UE;
    a first transmitter that transmits the video signal from the first UE over a first network channel of the network connection;
    a second transmitter that transmits the content file from the first UE over a second network channel of the network connection;
    a first receiver that receives the video signal on the first channel at the second UE;
    a second receiver that receives the content file on the second channel at the second UE;
    a decoder that decodes the content file to generate a content image at the second UE;
    a combiner that combines the video signal and the content image into a combined video signal at the second UE, wherein the content image forms a background image for the video signal; and
    a display that displays the combined video signal at the second UE.

11. The apparatus of claim 10, further comprising a portrait segmentor that performs portrait segmentation on the image signal to extract an image of a user to form the video signal.

12. The apparatus of claim 10, further comprising:
    a video encoder that encodes the video signal before transmission from the first UE on the first channel; and
    a content encoder that encodes the content file before transmission from the first UE on the second channel.

13. The apparatus of claim 10, further comprising:
    a server that comprises:
    a video receiver at a server that receives the video signal on the first network channel;
    a content receiver at the server that receives the content file on the second network channel;
    a video transmitter at the server that re-transmits the video signal on the first network channel; and
    a content transmitter at the server that re-transmits the content file on the second network channel.

14. The apparatus of claim 13, wherein the server operates without decoding the video signal or the content file.

15. The apparatus of claim 10, further comprising:
    a video decoder at the second UE that decodes the video signal.

16. The apparatus of claim 10, further comprising:
    a processor at the second UE that receives user input that identifies at least one of size, location, and ratio of the video signal and the content image; and
    a combiner that receives the user input from the processor to combine the video signal and the content image into a combined video signal based on the user input.

17. The apparatus of claim 10, wherein the combiner combines the video signal and the content image so that the video signal and the content image form a picture-in-picture configuration.

18. The apparatus of claim 10, further comprising an encryption apparatus at the first UE and a decryption apparatus at the second UE that operate to perform end-to-end encryption of the video signal and the content file between the first UE and the second UE.

19. A non-transitory computer readable medium on which are stored program instructions that, when executed by one or more processors, cause the one or more processors to perform operations of:
    establishing a network connection;
    receiving a video signal on a first channel of the network connection;
    receiving a content file on a second channel of the network connection;

decoding the content file to generate a content image;
combining the video signal and the content image into a combined video signal, wherein the content image forms a background image for the video signal; and
displaying the combined video signal on a display device.

20. The non-transitory computer readable medium of claim 19, wherein the program instructions cause the one or more processors to perform an operation of combining the video signal and the content image so that the video signal and the content image from a picture-in-picture configuration.

\* \* \* \* \*